US012026225B2

(12) United States Patent
Shimada et al.

(10) Patent No.: US 12,026,225 B2
(45) Date of Patent: Jul. 2, 2024

(54) MONITORING CAMERA, PART ASSOCIATION METHOD AND PROGRAM

(71) Applicant: PANASONIC I-PRO SENSING SOLUTIONS CO., LTD., Fukuoka (JP)

(72) Inventors: Takeshi Shimada, Fukuoka (JP); Takuya Kise, Fukuoka (JP); Hiroaki Ootake, Fukuoka (JP); Yoshitaka Fukushima, Fukuoka (JP); Masakazu Fujii, Fukuoka (JP); Toshihiko Yamahata, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 192 days.

(21) Appl. No.: 17/472,238

(22) Filed: Sep. 10, 2021

(65) Prior Publication Data
US 2022/0083811 A1    Mar. 17, 2022

(30) Foreign Application Priority Data

Sep. 14, 2020 (JP) .................................. 2020-154092
Sep. 14, 2020 (JP) .................................. 2020-154093

(51) Int. Cl.
| G06F 18/211 | (2023.01) |
| G06F 18/214 | (2023.01) |
| G06N 20/00 | (2019.01) |
| G06V 10/25 | (2022.01) |
| G06V 20/52 | (2022.01) |
| G06V 40/10 | (2022.01) |
| G06V 40/16 | (2022.01) |

(52) U.S. Cl.
CPC .......... *G06F 18/211* (2023.01); *G06F 18/214* (2023.01); *G06V 10/25* (2022.01); *G06V 20/52* (2022.01); *G06V 40/103* (2022.01); *G06V 40/171* (2022.01); *G06N 20/00* (2019.01)

(58) Field of Classification Search
CPC ..... G06F 18/211; G06F 18/214; G06V 10/25; G06V 20/52; G06V 40/103; G06V 40/171; G06V 2201/07; G06V 10/993; G06N 20/00
See application file for complete search history.

(56) References Cited

U.S. PATENT DOCUMENTS

| 10,366,586 B1* | 7/2019 | Leizerovich ........... G06V 20/52 |
| 11,113,514 B2* | 9/2021 | Zhang .................... G06V 20/53 |

(Continued)

FOREIGN PATENT DOCUMENTS

| JP | 2009-075868 | 4/2009 |
| JP | 2012-203592 | 10/2012 |

(Continued)

*Primary Examiner* — Wesley J Tucker
(74) *Attorney, Agent, or Firm* — Greenblum and Bernstein, P.L.C.

(57) ABSTRACT

A monitoring camera includes a capturing unit that is configured to capture an image of at least one object within the angle of view, and a processor that is equipped with the artificial intelligence and that is configured to detect a plurality of characteristic parts of the object reflected in a captured image input from the capturing unit based on the artificial intelligence. The processor associates, for each of the at least one object, information for specifying each of the plurality of detected characteristic parts with a same object ID.

18 Claims, 8 Drawing Sheets

| SCAPULA UPPER PORTION IS DETECTED | ONLY FACE IS DETECTED | ONLY WHOLE BODY IS DETECTED | ONLY WHOLE BODY AND FACE ARE DETECTED |
|---|---|---|---|
| TRACKING FRAME | | | |
| EMPLOYING SCAPULA UPPER FRAME | EMPLOYING FACE FRAME BY TWO TIMES | WIDTH: 0.6 TIMES WIDTH OF WHOLE BODY<br>HEIGHT: 1.07 TIMES WIDTH OF WHOLE BODY<br>CENTER X: WHOLE BODY CENTER POSITION<br>CENTER Y: UPPER END OF WHOLE BODY + 0.2 TIMES HEIGHT OF WHOLE BODY | AVERAGING FRAME BASED ON CASE OF ONLY FACE AND CASE OF ONLY WHOLE BODY |
| B1,C1 | C2  B2 | X  Y  C3 | B2  C4 |
| | | B3 | B3 |

(56) References Cited

U.S. PATENT DOCUMENTS

| | | | | |
|---|---|---|---|---|
| 11,514,703 B2* | 11/2022 | Oya | ............... | G06V 20/52 |
| 11,594,043 B1* | 2/2023 | Xu | ............... | G06V 10/82 |
| 11,610,078 B2* | 3/2023 | Goel | ............... | G06N 3/045 |
| 11,640,726 B2* | 5/2023 | Arai | ............... | G06V 20/52 |
| | | | | 382/116 |
| 2009/0080711 A1 | 3/2009 | Yokoi | | |
| 2011/0255741 A1* | 10/2011 | Jung | ............... | G06V 20/58 |
| | | | | 382/103 |
| 2017/0004369 A1* | 1/2017 | Kim | ............... | G06F 18/28 |
| 2017/0195637 A1* | 7/2017 | Kusens | ............... | G06T 7/0012 |
| 2018/0039853 A1* | 2/2018 | Liu | ............... | G06V 10/768 |
| 2019/0057249 A1* | 2/2019 | Hayase | ............... | G06V 40/173 |
| 2019/0130189 A1* | 5/2019 | Zhou | ............... | G06V 10/7515 |
| 2019/0164020 A1* | 5/2019 | Sabripour | ............... | G06F 18/24 |
| 2019/0188456 A1 | 6/2019 | Shibata et al. | | |
| 2019/0356885 A1* | 11/2019 | Ribeiro | ............... | G06T 7/70 |
| 2020/0151489 A1* | 5/2020 | Sriram | ............... | G06N 3/08 |
| 2021/0279475 A1* | 9/2021 | Tusch | ............... | H04L 63/0861 |
| 2022/0164963 A1* | 5/2022 | Miyamoto | ............... | G06T 7/248 |
| 2023/0245323 A1* | 8/2023 | Araki | ............... | G06T 7/70 |
| | | | | 382/103 |

FOREIGN PATENT DOCUMENTS

| | | |
|---|---|---|
| JP | 2016-119626 | 6/2016 |
| JP | 2017-025621 | 2/2017 |
| JP | 2019-109709 | 7/2019 |
| JP | 2020-145511 | 9/2020 |

* cited by examiner

FIG. 3

| | ATTRIBUTE INFORMATION | | | | |
|---|---|---|---|---|---|
| WHOLE BODY FRAME IMAGE | CLOTHING COLOR | CLOTHING TYPE | BAG | MUFFLER | ... |
| SCAPULA UPPER FRAME IMAGE | HAIRSTYLE | HAIR COLOR | BEARD | MASK | GLASSES | AGE | GENDER | ... |

TBL1

FIG. 7

| SCAPULA UPPER PORTION IS DETECTED | ONLY FACE IS DETECTED | ONLY WHOLE BODY IS DETECTED | ONLY WHOLE BODY AND FACE ARE DETECTED |
|---|---|---|---|
| | | TRACKING FRAME | |
| EMPLOYING SCAPULA UPPER FRAME | EMPLOYING FACE FRAME BY TWO TIMES | WIDTH: 0.6 TIMES WIDTH OF WHOLE BODY<br>HEIGHT: 1.07 TIMES WIDTH OF WHOLE BODY<br>CENTER X: WHOLE BODY CENTER POSITION<br>CENTER Y: UPPER END OF WHOLE BODY + 0.2 TIMES HEIGHT OF WHOLE BODY | AVERAGING FRAME BASED ON CASE OF ONLY FACE AND CASE OF ONLY WHOLE BODY |

MONITORING CAMERA, PART ASSOCIATION METHOD AND PROGRAM

CROSS REFERENCE TO RELATED APPLICATIONS

This application is based on Japanese Patent Application Nos. 2020-154092 and 2020-154093 both filed on Sep. 14, 2020, the contents of which are incorporated herein by reference.

BACKGROUND OF THE INVENTION

1. Technical Field

The present disclosure relates to a monitoring camera, a part association method and a program.

2. Background Art

JP-A-2017-25621 discloses an entry/exit management system which includes an authentication terminal that reads identification information and a face image of an authentication target from a recording medium, an authentication device that performs authentication, and a door control device that controls the opening and closing of the door based on the verification result of the authentication device. In a predetermined period including a time when the authentication terminal reads the identification information, the authentication device detects a face of a person from the video data captured by the monitoring camera and cuts out an image in the vicinity of the face, and calculates the degree of match between the face image of the authentication target and the extracted face image. In addition, when the identification information matches the permission information and the degree of match is equal to or greater than a predetermined threshold value, the authentication device performs control to open the door by driving the door control device.

SUMMARY OF INVENTION

In the JP-A-2017-25621, it is assumed that whether or not opening/closing of the door is permitted is determined, and thus an image used for this determination is only a face image of a person reflected in the video data captured by the monitoring camera. On the other hand, there is a need to search for an object (for example, a person) reflected in video data captured by a large number of monitoring cameras installed outdoors such as in the city or indoors such as in a facility with high accuracy. In order to support such a search, it is conceivable to associate and save the object (for example, a person) reflected in the video data captured by the monitoring cameras and the face images thereof. However, as in the JP-A-2017-25621, preparing only a face image in preparation for a search for an object (for example, a person) is not sufficient to realize a highly accurate search.

The present disclosure has been made in view of the above-described circumstances, and an object of the present disclosure is to provide a monitoring camera, a part association method, and a program for supporting improvement of search accuracy of one or more objects reflected in video data within an angle of view.

The present disclosure provides a monitoring camera including a capturing unit that captures an image of at least one object in an angle of view; and a processor that is equipped with artificial intelligence and that detects a plurality of characteristic parts of the object reflected in a captured image input from the capturing unit based on the artificial intelligence, wherein the processor associates, for each of the at least one object, information for specifying each of the plurality of detected characteristic parts with a same object ID.

In addition, the present disclosure provides a part association method performed by a monitoring camera that is equipped with artificial intelligence, the part association method including capturing an image of at least one object in an angle of view; detecting a plurality of characteristic parts of the object reflected in an input captured image based on the artificial intelligence; and associating, for each of the at least one object, information for specifying each of the plurality of detected characteristic parts with a same object ID.

The present disclosure provides a monitoring camera including a capturing unit that captures an image of at least one object in an angle of view; and a processor that is equipped with artificial intelligence and that detects a characteristic part of the object reflected in a captured image input from the imaging unit based on the artificial intelligence, wherein the processor determines whether or not a detection part that is the part detected based on the artificial intelligence is a priority part suitable for tracking processing of the object, and uses the priority part as a tracking frame to perform the tracking processing of the object when it is determined that the detection part is the priority part.

The present disclosure provides a tracking frame generation method performed by a monitoring camera equipped with artificial intelligence, the tracking frame generation method comprising capturing an image of at least one object in an angle of view; detecting a characteristic part of the object reflected in an input captured image based on the artificial intelligence; determining whether or not a detection part that is the part detected based on the artificial intelligence is a priority part suitable for tracking processing of the object; and using the priority part as a tracking frame to perform the tracking processing of the object when it is determined that the detection part is the priority part.

According to the present disclosure, it is possible to support the improvement of search accuracy of one or more objects reflected in the video data within the angle of view.

BRIEF DESCRIPTION OF THE DRAWINGS

FIG. 3 is an attribute information table showing an example of a relationship between an image type and an attribute identified by a monitoring camera.

FIG. 7 is an explanatory diagram of a generation example of a tracking frame.

DETAILED DESCRIPTION OF THE EXEMPLARY EMBODIMENT

Background of Present Disclosure

Figure 1:
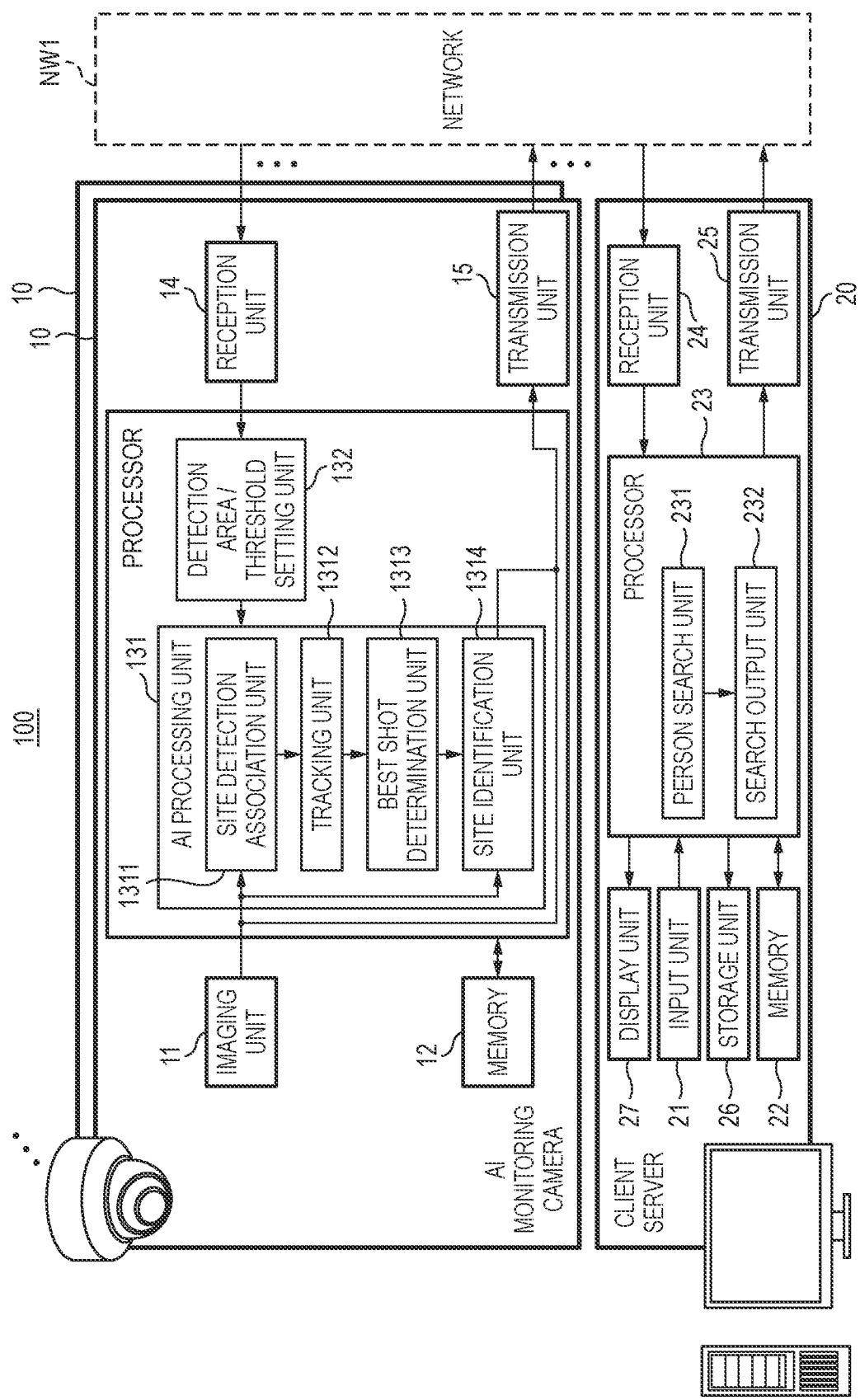
FIG. 1 shows a system configuration example of a monitoring camera system according to Embodiment 1.

In JP-A-2017-25621, it is assumed that whether or not opening/closing of the door is permitted is determined, and thus an image used for this determination is only a face image of a person reflected in the video data captured by the monitoring camera. On the other hand, there is a need to search for an object (for example, a person) reflected in video data captured by a large number of monitoring cameras installed outdoors such as in the city or indoors such as in a facility with high accuracy. In order to support such a search, it is conceivable to associate and save the object (for example, a person) reflected in the video data captured by the monitoring cameras and the face images thereof. However, as in JP-A-2017-25621, preparing only a face image in preparation for a search for an object (for example, a person) is not sufficient to realize a highly accurate search.

Therefore, in the following Embodiment 1, an example of a monitoring camera, a part association method, and a program for supporting improvement of search accuracy of one or more objects reflected in video data within an angle of view will be described.

On one hand, in JP-A-2017-25621, it is assumed that whether or not opening/closing of the door is permitted is determined, and thus an image used for this determination is only a face image of a person reflected in the video data captured by the monitoring camera. On the other hand, there is a need to track a row (so-called moving line) of an object (for example, a person to be monitored) reflected in video data captured by a large number of monitoring cameras installed outdoors such as in the city or indoors such as in a facility with high accuracy. In order to support such a track, it is conceivable to associate and save the object (for example, a person) reflected in the video data captured by the monitoring cameras and the face images thereof. However, as in JP-A-2017-25621, only using a face image for tracking an object (for example, a person to be monitored) is not sufficient to realize a highly accurate tracking.

Therefore, an object of the following Embodiment 1 is to provide a monitoring camera, a tracking frame generation method, and a program for supporting improvement of tracking accuracy of an object reflected in video data within an angle of view.

Hereinafter, embodiments of a monitoring camera, a part association method and a program according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding for those skilled in the art. Incidentally, the accompanying drawings and the following description are provided for those skilled in the art to fully understand the present disclosure, and are not intended to limit the subject matter described in the claims.

FIG. 1 shows a system configuration example of a monitoring camera system 100 according to Embodiment 1. The monitoring camera system 100 includes at least one monitoring camera 10 and a client server 20. The client server 20 and each monitoring camera 10 are communicably connected to each other via a network NW1. The network NW1 may be a wired network (for example, a wired local area network (LAN)), a wireless network (for example, a wireless LAN such as Wi-Fi (registered trademark), a wireless wide area network (WAN), a fourth generation mobile communication system (4G), or a fifth generation mobile communication system (5G)). Incidentally, the configuration of the monitoring camera included in the monitoring camera system 100 may be the same as that of the monitoring camera 10, or may include a monitoring camera having a configuration different from the configuration of the monitoring camera 10 other than the monitoring camera 10.

The monitoring camera 10 is a computer including an artificial intelligence (AI), and captures an image of a monitoring area (for example, indoor or outdoor) designated by an operator of the monitoring camera system 100. The monitoring camera 10 acquires data of the captured image by capturing an image of a monitoring area, and detects a characteristic part of an object (for example, a person) reflected in the data of the captured image based on AI. In the following description, a person is mainly illustrated as an object, but the object is not limited to a person, and may be, for example, a vehicle such as a vehicle or a bicycle, or may be a person and a vehicle (see FIG. 5).

The monitoring camera 10 includes an imaging unit 11, a memory 12, a processor 13, a reception unit 14, and a transmission unit 15. Each of the imaging unit 11, the memory 12, the reception unit 14, and the transmission unit 15 is connected to the processor 13 via an internal bus (not shown) so that data can be input or output.

The imaging unit 11 includes at least a lens (not shown) as an optical element and an image sensor (not shown). The lens receives light reflected by an object (an example of a subject) in the monitoring area, and forms an optical image of the subject on a light receiving surface (in other words, an imaging surface) of the image sensor. The image sensor is, for example, a solid-state imaging sensor such as a charged coupled device (CCD) or a complementary metal oxide semiconductor (CMOS). The image sensor converts the optical image formed on the imaging surface through the lens into an electrical signal for each predetermined time (for example, 1/30 (seconds)), and transmits the electrical signal to the processor 13. For example, when the predetermined time is 1/30 (seconds), the frame rate of the monitoring camera 10 is 30 fps. In addition, the imaging unit 11 may generate the data of the captured image by performing predetermined signal processing on the electrical signal at each predetermined time described above. Incidentally, the processing of generating the data of the captured image may be executed by the processor 13. The imaging unit 11 outputs the data of the captured image to the processor 13.

The memory 12 is configured using, for example, a random access memory (RAM) and a read only memory (ROM), and temporarily holds a program necessary for executing the operation of the monitoring camera 10, and further, data generated during the operation. The RAM is, for example, a work memory used during the operation of the monitoring camera 10. The ROM stores and holds, for example, a program according to the present disclosure for controlling the monitoring camera 10 in advance. In other words, the processor 13 can execute various types of processing (steps) related to the part association method according to the present disclosure to the monitoring camera 10, which is a computer, by executing a program stored in the ROM. For example, the memory 12 temporarily stores data of a captured image captured by the imaging unit 11 and data (described later) to be transmitted to the client server 20.

Further, the memory 12 may further include a flash memory in addition to the RAM and the ROM, and may store data of the captured image or transmission data (described later) to be transmitted to the client server 20. In addition, the memory 12 stores data of a learning model for AI processing (described later) used by an AI processing unit 131 (described later).

The processor 13 is configured using, for example, a central processing unit (CPU), a digital signal processor (DSP), a graphical processing unit (GPU), or a field-programmable gate array (FPGA). The processor 13 functions as a controller that controls the overall operation of the monitoring camera 10, and performs control processing for controlling the operation of each part of the monitoring camera 10, input/output processing of date with each part of the monitoring camera 10, arithmetic processing of data, and storage processing of data. The processor 13 operates according to a program stored in the memory 12. In addition, the processor 13 uses the memory 12 at the time of operation, and temporarily saves the data generated or acquired by the processor 13 in the memory 12. The processor 13 includes an AI processing unit 131 and a detection area/threshold setting unit 132.

The AI processing unit 131 uses the data of the learning model for AI processing read from the memory 12 so as to be executable by the AI processing unit 131 (in other words, based on AI), and executes various types of processing on the data of the captured image input (in other words, input) from the imaging unit 11 under the parameter (described later) set by the detection area/threshold setting unit 132. Here, the data of the learning model for AI processing includes, for example, a program that defines the contents of various types of processing executed by the AI processing unit 131, parameters necessary for various types of processing, and teacher data. Specifically, the AI processing unit 131 includes a site detection association unit 1311, a tracking unit 1312, a best shot determination unit 1313, and a site identification unit 1314.

Here, the learning processing for generating the data of the learning model for AI processing may be performed using one or more statistical classification techniques. Examples of the statistical classification technique include, for example, linear classifiers, support vector machines, quadratic classifiers, kernel density estimation (Kernel Estimation), decision trees, artificial neural networks, a bayesian techniques and/or networks, hidden markov models, binary classifiers, multi-class classifiers, a clustering technique, a random forest technique, a logistic regression technique, a linear regression technique, a gradient boosting technique, and the like. However, the statistical classification technique used is not limited thereto. In addition, the generation of the data of the learning model may be performed by the AI processing unit 131 in the monitoring camera 10, or may be performed by the client server 20, for example The site detection association unit 1311 detects a plurality of characteristic parts (sites) of the object, which are reflected in the data of the captured image input from the imaging unit 11, based on the AI. The site detection association unit 1311 associates (links) a plurality of parts corresponding to the same object detected with an object ID (ID: identification) serving as identification information of the object (refer to FIG. 2).

Figure 2:
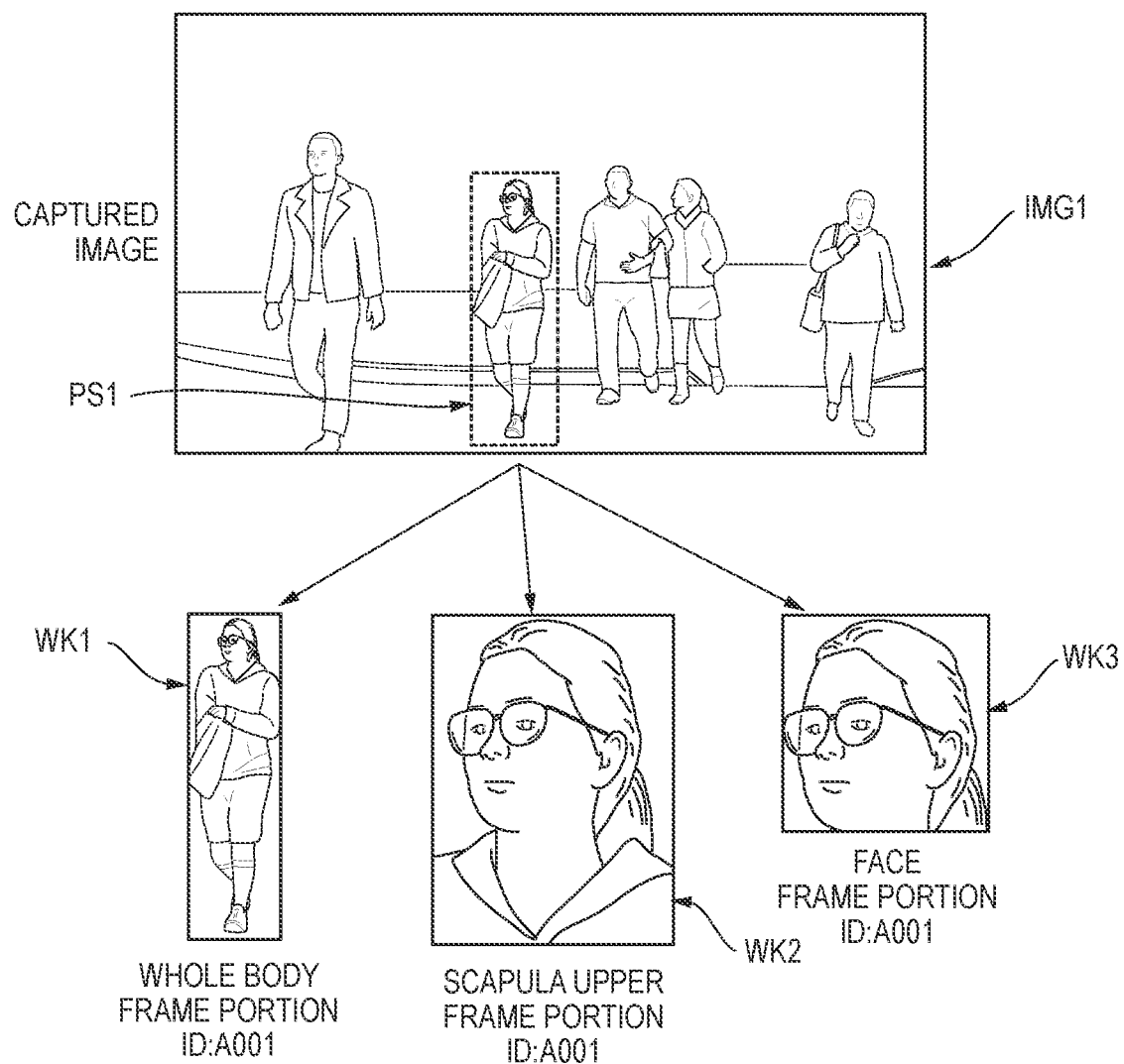
FIG. 2 shows an example of a type of an image associated with the same object ID for a person as an object reflected in the data of a captured image.

FIG. 2 is a diagram illustrating an example of a type of an image associated with the same object ID for a person PS1 as an object reflected in the data of a captured image IMG1. The captured image IMG1 illustrated in FIG. 2 indicates a state in which a plurality of persons are crossing the pedestrian crossing. The site detection association unit 1311 detects each individual object (for example, a person) reflected in the captured image IMG1, and detects the characteristic parts of each person (for example, the person PS1) and associates the characteristic parts with the identification information of the same person.

Here, the characteristic parts of the object to be detected are parts indicating the physical feature of the person in order to improve the search accuracy of the person PS1 by the client server 20, and are, for example, the whole body of the person PS1, the upper part of the shoulder of the person PS1, and the face of the person PS1. That is, accompanying with the detection of the person PS1, the site detection association part 1311 generates information (for example, coordinates indicating a position in the captured image or a cut-out image of each portion) for specifying the whole body frame portion WK1, the scapula upper frame portion WK2, and the face frame portion WK3 from the data of the captured image IMG1. Further, the site detection association unit 1311 uses the object ID (for example, A001) that is the identification information of the detected person PS1 to assigns the same object ID (for example, A001) to the information (see above) for specifying the whole body frame portion WK1, the scapula upper frame portion WK2, and the face frame portion WK3 and associates the information. Accordingly, the site detection association unit 1311 can associate three different parts of the whole body frame portion WK1, the scapula upper frame portion WK2, and the face frame portion WK3 with the same person PS1 as characteristic parts for searching for the same person (for example, the person PS1) reflected in the data of the captured image IMG1, and thus it is possible to improve the search accuracy of the person PS1 by the client server 20.

The tracking unit 1312 generates a tracking frame for the tracking processing described later using the detection result by the site detection association unit 1311 and the result of the association processing (see FIG. 7). A method of generating the tracking frame will be described later with reference to FIG. 7. In addition, the tracking unit 1312 performs the tracking processing for tracking the row (so-called moving line) of the object reflected in the data of the captured image input from the imaging unit 11, using the detection result by the site detection associating unit 1311 and the result of the association processing (for example, the coordinate information of each of the plurality of parts associated with the object ID of the object reflected in the data of the captured image).

The best shot determination unit 1313 inputs the detection result and the result of the association processing by the site detection association unit 1311, and the result of the tracking processing of the object by the tracking unit 1312. The best shot determination unit 1313 determines whether or not the part detected by the site detection association unit 1311 is the best shot having an image quality suitable for the identification processing of the attribute information, based on the detection result and the association result by the site detection association unit 1311, and the result of the tracking processing of the object by the tracking unit 1312.

Here, whether or not the part detected by the site detection association unit 1311 is the best shot can be determined as follows. For example, when at least one of the whole body of the person PS1, the scapula upper portion of the person PS1, and the face of the person PS1 is detected by the site detection association unit 1311 in the frame, the best shot determination unit 1313 determines that the detected part is the best shot. On the other hand, when any one of the whole body of the person PS1, the scapula upper portion of the person PS1, and the face of the person PS1 is not detected by the site detection association unit 1311 in the frame, the best shot determination unit 1313 determines that there is no part of the best shot. In addition, when the whole body of the person PS1, the scapula upper portion of the person PS1, and the face of the person PS1 are detected in the frame and the detection position (that is, the coordinates in the captured image) is in the vicinity of the center (in other words, not in the vicinity of the edge of the captured image), the best shot determination unit 1313 may determine that each part is the best shot.

When the site identification unit 1314 receives the determination result from the best shot determination unit 1313 that the part detected by the site detection association unit 1311 is the best shot, the site identification unit 1314 cuts out an image (see FIG. 2) of the characteristic part of the object determined to be the best shot from the frame input from the imaging unit 11 based on the object ID, and identifies the attribute information (see FIG. 3) for each image of the cut-out part based on AI (for example, deep learning). That is, the site identification unit 1314 identifies the attribute information (see FIG. 3) of the cut-out image (see FIG. 2) of the characteristic part of the object cut out by the site detection association unit 1311 based on AI (for example, deep learning) (for example, analyzes what kind of content the attribute information has).

Here, the attribute information will be described with reference to FIG. 3. FIG. 3 is an attribute information table showing an example of a relationship between an image type and an attribute identified by the monitoring camera 10. In FIG. 3, an object is a person, and a whole body frame image and a scapula upper frame image are illustrated as cut-out images (see FIG. 2) of a part to be subjected to the identification processing by the site identification unit 1314.

The site identification unit 1314 identifies and extracts characteristic elements (for example, the color of clothes, the type of clothes, presence/absence of bag, and presence/absence of muffler) reflected in the whole body frame image of the object as attribute information. Incidentally, the type of clothing indicates the length of the sleeve of the clothing to which the object (for example, a person) is attached. The attribute information, which is a characteristic element, is a search item that can be used as a search condition (that is, a characteristic element of a person obtained from an image showing the whole body of a person) at the time of searching for a person by the client server 20. Accordingly, when such attribute information is input as a search condition, the efficiency of search can be increased in that the load of the search processing of the client server 20 can be reduced.

In addition, the site identification unit 1314 identifies and extracts characteristic elements (for example, hairstyle, hair color, beard, presence/absence of mask, presence/absence of glasses, age, gender) reflected in the scapula upper frame image of the object as attribute information. The attribute information, which is a characteristic element, is a search item that can be used as a search condition (that is, a characteristic element of a person obtained from an image showing the scapula upper portion of a person) at the time of searching for a person by the client server 20. Accordingly, when such attribute information is input as a search condition, the efficiency of search can be increased in that the load of the search processing of the client server 20 can be reduced.

The detection area/threshold value setting unit 132 acquires setting data of a masking area (that is, an area to be excluded from detection of an object) transmitted from the client server 20 via the reception unit 14, and sets the setting data in the AI processing unit 131. The setting data is a parameter used at the time of the AI processing by the AI processing unit 131. For example, when the setting data of the masking area is set in the AI processing unit 131, the site detection association unit 1311 detects an area excluding the masking area from the monitoring area within the angle of view of the monitoring camera 10 as an area for detecting the object.

In addition, the detection area/threshold value setting unit 132 acquires setting data of a threshold value for detection transmitted from the client server 20 via the reception unit 14 and sets the setting data in the AI processing unit 131. The setting data is a parameter used at the time of the AI processing by the AI processing unit 131. For example, when the setting data of the threshold value is set in the AI processing unit 131, the site detection association unit 1311 outputs the detection result when the score (in other words, the probability indicating the detection accuracy) obtained as the AI processing result exceeds the setting data of the threshold value.

The reception unit 14 is configured using a communication circuit for receiving data from the network NW1, and receives, for example, data transmitted from the client server 20 via the network NW1. For example, the reception unit 14 receives the data of the detection area transmitted from the client server 20 or the data of the threshold value for detection of the part of the object using the AI, and outputs the data to the processor 13.

The transmission unit 15 is configured using a communication circuit for transmitting data to the network NW1, and transmits, for example, data generated by the processor 13 via the network NW1. For example, the transmission unit 15 transmits the transmission data generated by the processor 13 (for example, the identification result of the attribute information for each part of the object and the information related to the best shot used for the identification processing) to the client server 20 via the network NW1.

The client server 20 is a computer used by a user who is a user of the monitoring camera system 100 operated by the operator, and transmits and receives data to and from the monitoring camera 10 via the network NW1. The client server 20 can transmit setting data (see above), which is an example of a parameter of the monitoring camera 10, to the monitoring camera 10 via the network NW1 and set the setting data. The setting data is, for example, setting data of a masking area or setting data of a threshold value for detection of an object by AI of the monitoring camera 10. In addition, the client server 20 can extract or generate a thumbnail of image data or image data satisfying the search condition by referring to the storage unit 26 based on the search condition (for example, the attribute information illustrated in FIG. 3) input by the operation of the user, and display the thumbnail of the image data or the image data on the display unit 27.

The client server 20 includes an input unit 21, a memory 22, a processor 23, a reception unit 24, a transmission unit 25, a storage unit 26, and a display unit 27. Each of the input unit 21, the memory 22, the reception unit 24, the transmission unit 25, the storage unit 26, and the display unit 27 is connected to the processor 23 such that data can be input or output via an internal bus (not shown). Incidentally, when the configuration of the computer including the input unit 21, the memory 22, the processor 23, the reception unit 24, the transmission unit 25, the storage unit 26, and the display unit 27 is provided, instead of the client server 20, a personal computer (PC), a smartphone, or a tablet may be used.

The input unit 21 is a user interface that detects an input operation by the user, and is configured using, for example, a mouse, a keyboard, a touch panel, or the like. The input unit 21 receives data of various types of input items (for example, search conditions of an object) specified by an input operation of the user, and transmits the data to the processor 23.

The memory 22 is configured using, for example, a RAM and a ROM, and temporarily holds a program necessary for executing the operation of the client server 20, and further, data generated during the operation. The RAM is, for example, a work memory used during the operation of the client server 20. The ROM stores and holds, for example, a program for controlling the client server 20 in advance. In other words, the processor 23 can execute various types of processing (steps) on the client server 20, which is a computer, by executing a program stored in the ROM. For example, the memory 12 stores a program for performing search processing of image data or a thumbnail of an object that satisfies the search condition input by the input unit 21.

The processor 23 is configured using, for example, a CPU, a DSP, a GPU, or an FPGA. The processor 23 functions as a controller that controls the entire operation of the client server 20, and performs control processing for controlling the operation of each unit of the client server 20, input/output processing of data with each unit of the client server 20, arithmetic processing of data, and storage processing of data. The processor 23 operates according to the program stored in the memory 22. The processor 23 uses the memory 22 during operation, and temporarily saves the data generated or acquired by the processor 23 in the memory 22. The processor 23 includes a person search unit 231 and a search output unit 232.

The person search unit 231 performs search processing of the image data or the thumbnail of the object that satisfies the search condition input by the input unit 21 by the operation of the user, and sends the result of the search processing to the search output unit 232.

The search output unit 232 outputs the result of the search processing from the person search unit 231 to the display unit 27 and display the result.

The reception unit 24 is configured using a communication circuit for receiving data from the network NW1, and receives, for example, transmission data transmitted from the monitoring camera 10 (for example, the identification result of the attribute information of each part of the object and information on the best shot used for the identification processing) via the network NW1. For example, the reception unit 24 receives the transmission data transmitted from the monitoring camera 10 and outputs the transmission data to the processor 23.

The transmission unit 25 is configured using a communication circuit for transmitting data to the network NW1, and transmits, for example, data generated by the processor 23 via the network NW1. For example, the transmission unit 25 transmits the data of the detection area generated by the processor 23 or the data of the threshold value for detection of the part of the object using the AI to the monitoring camera 10 via the network NW1.

The storage unit 26 is configured using, for example, a flash memory, a hard disk drive (HDD), or a solid state drive (SSD). The storage unit 26 stores (saves) the transmission data transmitted from one or more monitoring cameras 10 in association with the identification information of the monitoring camera 10 of the transmission source.

The display unit 27 is configured using, for example, a display such as an liquid crystal display (LCD) or an organic electroluminescence (EL). The display unit 27 displays the data of the search result generated by the processor 23 based on the operation of the operation.

Figure 4:
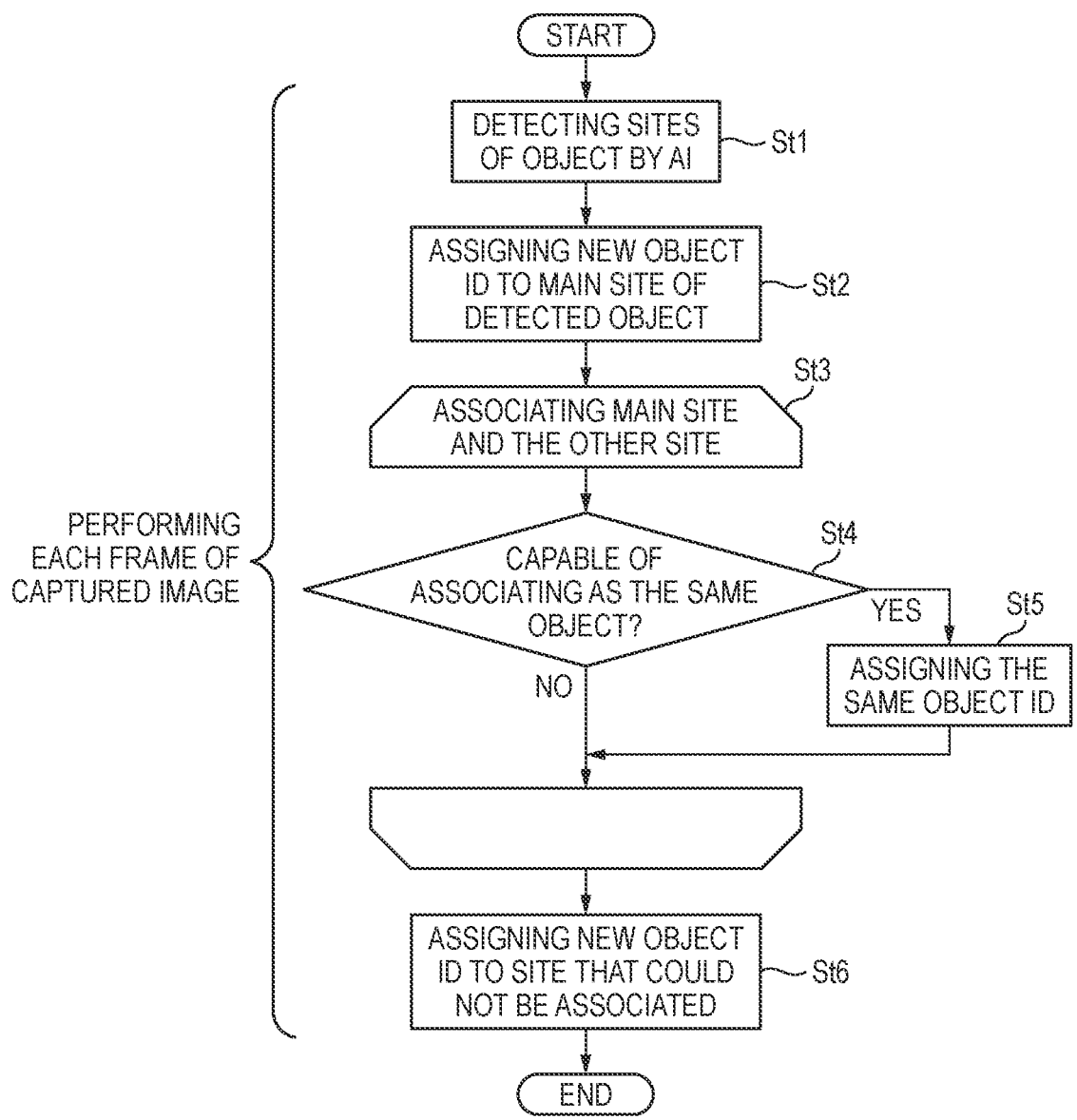
FIG. 4 is a flowchart showing an example of an operation procedure of association processing by the monitoring camera according to Embodiment 1.

Next, an example of an operation procedure of the association process of the monitoring camera 10 according to Embodiment 1 will be described with reference to FIG. 4. FIG. 4 is a flowchart showing an example of an operation procedure of association processing by the monitoring camera 10 according to Embodiment 1. The operation procedure illustrated in FIG. 4 is executed each time the data of the captured image is input to the processor 13 from the imaging unit 11 by the site detection association unit 1311 of the AI processing unit 131 of the processor 13 of the monitoring camera 10.

In FIG. 4, the AI processing unit 131 detects a plurality of characteristic parts (sites) of an object (for example, a person), which are reflected in the data of the captured image input from the imaging unit 11, based on AI (for example, the site detection association unit 1311) (St1). In step St1, as a detection result based on AI, for example, as shown in FIG. 2, information (for example, coordinates indicating the position in the captured image, or a cut-out image of each portion) for specifying the whole body frame portion WK1, the scapula upper frame portion WK2, and the face frame portion WK3 is generated.

The AI processing unit 131 assigns a new object ID (for example, "A001" illustrated in FIG. 2) to the information for specifying the main site (for example, the scapula upper portion) of the object detected in step St1 (for example, the coordinates indicating the position in the captured image of the main site or the cut-out image of the main site) (St2). Here, the reason why the main site (main part) in the case where the object is a person is the scapula upper portion is that the part of the person reflected in the data of the captured image is relatively stably detected, and the number of attribute information obtained by the identification processing of the scapula upper frame image corresponding to the scapula upper portion is the largest (see FIG. 3), and thus the usability as the characteristic part of the person as the object is high.

In step St3 following step St2, the AI processing unit 131 associates the main site to which the object ID is assigned in step St2 with other characteristic parts (St3 to St5). Steps St3 to St5 are executed for each main site of the object reflected in the data of the captured image input from the imaging unit 11. Incidentally, in the data of the captured image input from the imaging unit 11, when a plurality of parts cannot be detected in step St1 from the same object and are single, the association processing corresponding to the object cannot be performed, and thus the processing of steps St3 to St5 for the object is omitted.

The AI processing unit 131 determines whether or not the association processing is possible on the assumption that the main site of the object detected in step St1 and the other part of the object detected in step St1 are detected from the same object (St4). For example, the AI processing unit 131 determines whether or not there is another site (for example, a body frame portion or a face frame portion) detected from the same object (for example, a person) having a main site (for example, a scapula upper frame portion) detected in Step St1 (St4). In a case where there is no other part detected from the same object having the main site (St4, NO), since the association processing related to the object is not possible, the AI processing unit 131 executes the association processing relating to the other object reflected in the data of the captured image currently being processed. That is, the AI processing unit 131 determines whether or not the association processing of the main site and the other part can be performed for each object detected in step St11, and executes the association processing when it is determined that the association processing can be performed.

On the other hand, in a case where there is another part detected from the same object having the main site (St4. YES), the AI processing unit 131 performs the association processing by assigning the same object ID as the object ID assigned to the information for specifying the main site to the information (for example, the coordinate indicating the position in the captured image of the another part or the cut-out image of the other part) for specifying the another part detected from the same object having the main site (St5).

Incidentally, in a case where only a single part (for example, a whole body frame, a scapula upper portion, or a face) cannot be detected in Step St1, the AI processing unit 131 assigns a new object ID to information (for example, a coordinate indicating a position in the captured image of the part or a cut-out image of another part) for specifying the single part with respect to the object (St6).

Figure 5:
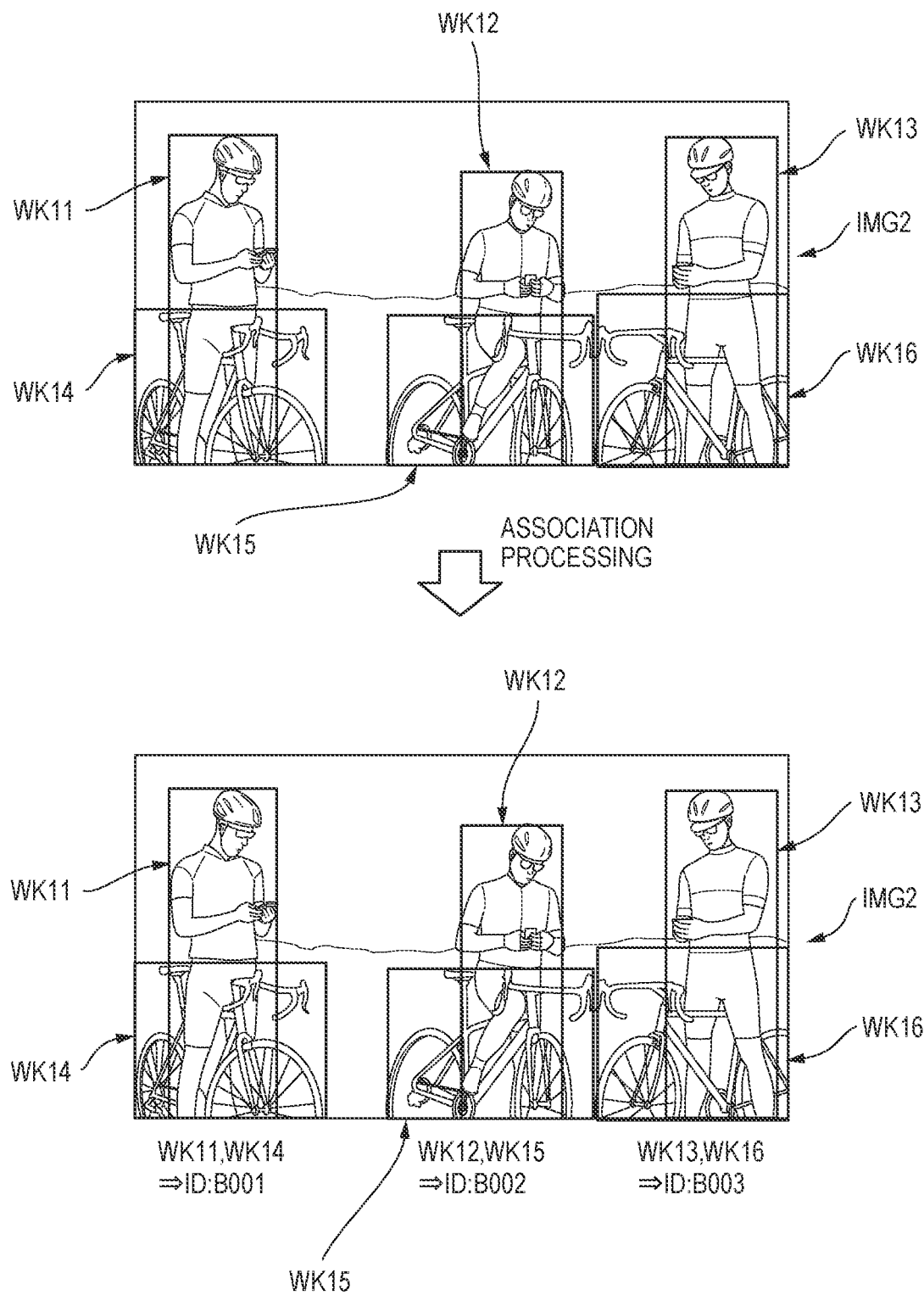
FIG. 5 is an explanatory diagram of an example of associating a person and a bicycle as an object reflected in data of a captured image.

In addition, in Embodiment 1, the site detection association unit 1311 of the AI processing unit 131 may associate main sites of objects reflected in the data of the captured image with each other (see FIG. 5). FIG. 5 is an explanatory diagram of an example of associating a person and a bicycle as an object reflected in data of a captured image IMG2. That is, in the example of FIG. 5, a pair of one person and one bicycle is a plurality of objects, and three pairs are shown.

Specifically, as illustrated in FIG. 5, three people and three bicycles are reflected in the data of the captured image IMG2. The bicycles used by each person are located close to each of the three people. When such data of the captured image IMG2 is input, the AI processing unit 131 detects each of the plurality of objects reflected in the data of the captured image IMG2 based on the AI, and specifies the part for each of the detected objects. For example, the AI processing unit 131 specifies the whole body frame portions WK11, WK12, WK13 of the person and the whole frame portions WK14, WK15, WK16 of the bicycle.

For example, based on the fact that the distance between the whole body frame portion WK11 of the person and the whole frame portion WK14 of the bicycle, the distance between the whole body frame portion WK12 of the person and the whole frame portion WK15 of the bicycle, and the distance between the whole body frame portion WK13 of the person and the whole frame portion WK16 of the bicycle are close to each other, the AI processing unit 131 performs the association processing on each of the whole body frame portion WK11 of the person, the whole frame portion WK14 of the bicycle, the whole body frame portion WK12 of the person, the whole frame portion WK15 of the bicycle, the whole body frame portion WK13 of the person, and the whole frame portion WK16 of the bicycle. For example, the AI processing unit 131 assigns the object ID "B001" to the whole body frame portion WK1 of the person and the whole frame portion WK14 of the bicycle, assigns the object ID "B002" to the whole body frame portion WK12 of the person and the whole frame portion WK15 of the bicycle, and assigns the object ID "B003" to the whole body frame portion WK13 of the person and the whole frame portion WK16 of the bicycle. Accordingly, the monitoring camera 10 can associate a pair of a plurality of objects having different types (for example, a person and a bicycle) reflected in the data of the captured image IMG2 with the same object ID.

Figure 6:
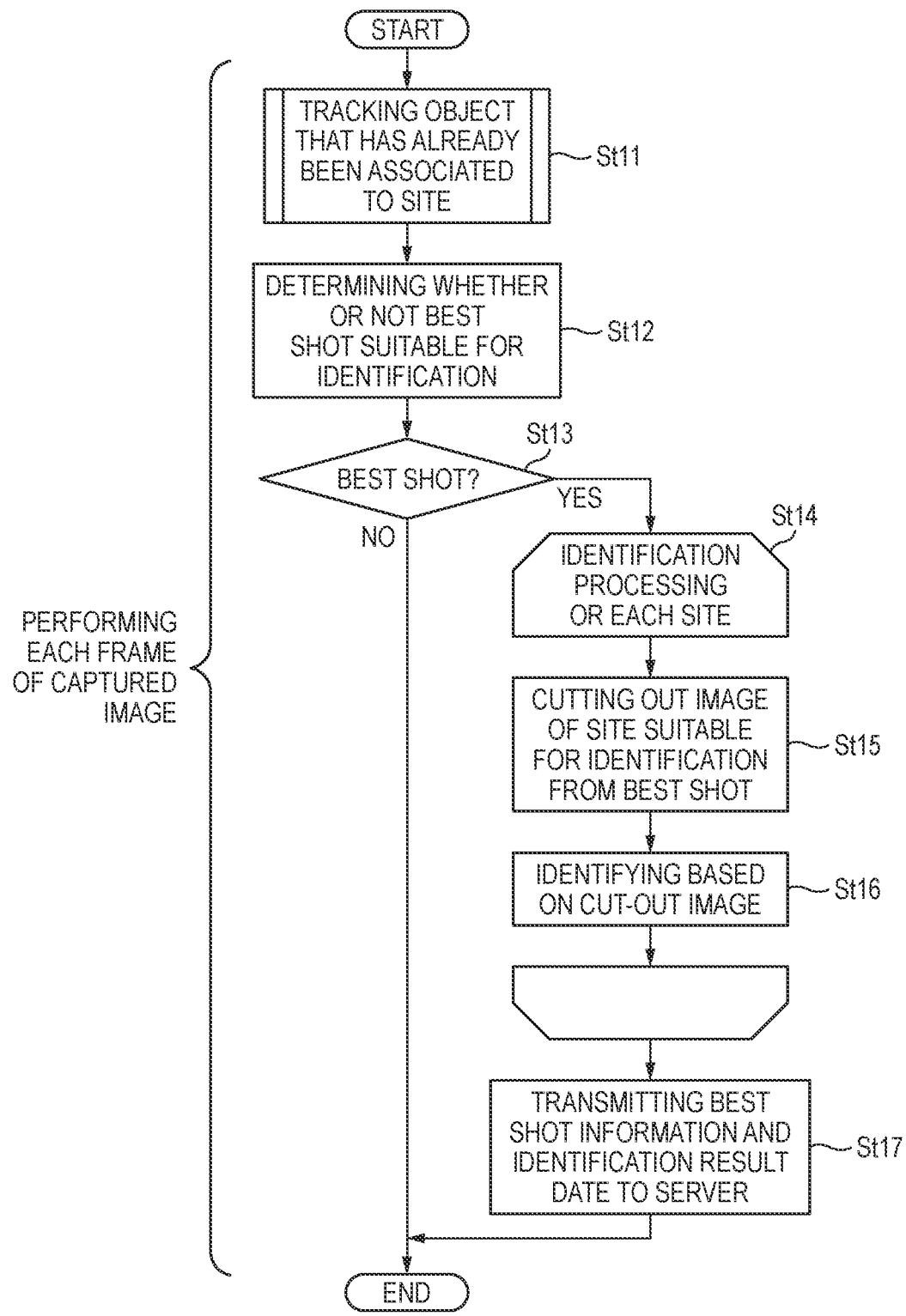
FIG. 6 is a flowchart showing an example of an operation procedure of identification processing for each part by the monitoring camera according to Embodiment 1.

Next, an example of an operation procedure of identification processing of the main site or the other part of the object of the monitoring camera 10 according to Embodiment 1 will be described with reference to FIG. 6. FIG. 6 is a flowchart showing an example of an operation procedure of identification processing for each site by the monitoring camera 10 according to Embodiment 1. The operation procedure illustrated in FIG. 6 is executed each time the data of the captured image is input to the processor 13 from the imaging unit 11 by each of the tracking unit 1312, the best shot determination unit 1313, and the site identification unit 1314 of the AI processing unit 131 of the processor 13 of the monitoring camera 10 after the operation procedure illustrated in FIG. 4. Therefore, before the operation procedure of FIG. 6 is started, the association processing result relating to the object described with reference to FIG. 4 is obtained.

In FIG. 6, the AI processing unit 131 performs, in the tracking unit 1312, the tracking processing (tracking) for tracking the row (so-called moving line) of the object using the association processing result (see FIG. 4) relating to one or more objects (for example, a person) reflected in the data of the captured image input from the imaging unit 11 (St11). The details of the operation in step St11 will be described in detail with reference to FIGS. 7 and 8.

The AI processing unit 131 determines whether or not the main site or the other part detected by the site detection association unit 1311 is the best shot suitable for the identification processing in the best shot determination unit 1313 (St12). Incidentally, since the method of determining whether or not the main site or the other part is the best shot is as described above, the description thereof is omitted here. When it is determined that the main site or the other part is not the best shot (St13, NO), since the data (frame) of the captured image is not suitable for the identification processing of the main site or the other part of the object, the operation procedure of FIG. 6 related to the data (frame) of the captured image ends.

When it is determined that the main site or the other part is the best shot (St13, YES), the AI processing part 131 executes the identification processing for each main site or the other part (St14 to St16). Specifically, the AI processing unit 131 cuts out an image of a corresponding site from the data of the captured image for each main site or the other part (in other words, part) determined to be the best shot (St15). That is, the AI processing unit 131 generates a cut-out image of the main site or the other part (St15).

The AI processing unit 131 executes the identification processing of the cut-out image based on AI (for example, deep learning) using the cut-out image of the main site or the other part generated in step St15 and the attribute information table (for example, a table that defines the relationship between the type of the cut-out image and the attribute information corresponding to the type, see FIG. 3) (St16). For example, when the type of the cut-out image is the scapula upper frame image, the AI processing unit 131 extracts the contents of the attribute information (for example, hairstyle, hair color, beard, presence/absence of mask, presence/absence of glasses, age, gender) corresponding to the scapula upper frame image. For example, in a case where the type of the cut-out image is the whole body frame image, the AI processing unit 131 extracts the contents of the attribute information (for example, color of clothes, type of clothes, presence/absence of bag, and presence/absence of muffler) corresponding to the whole body frame image.

The processor 13 acquires the identification result data of steps St14 to St16 executed by the AI processing unit 131, and generates transmission data including the identification result data and the best shot information indicating the information of the best shot used for the identification processing. The best shot information includes, for example, at least date and time information on which a captured image showing a part determined to be the best shot is captured, an ID of the best shot, and position information such as coordinates indicating a position in the captured image of the part determined to be the best shot. The identification result data includes, for example, at least a result of the identification processing by the AI processing unit 131 (for example, data indicating the content of each attribute information and a score indicating the identification processing accuracy of AI). The processor 13 transmits the generated transmission data to the client server 20 via the transmission unit 15 and the network NW1 (St17).

Figure 8:
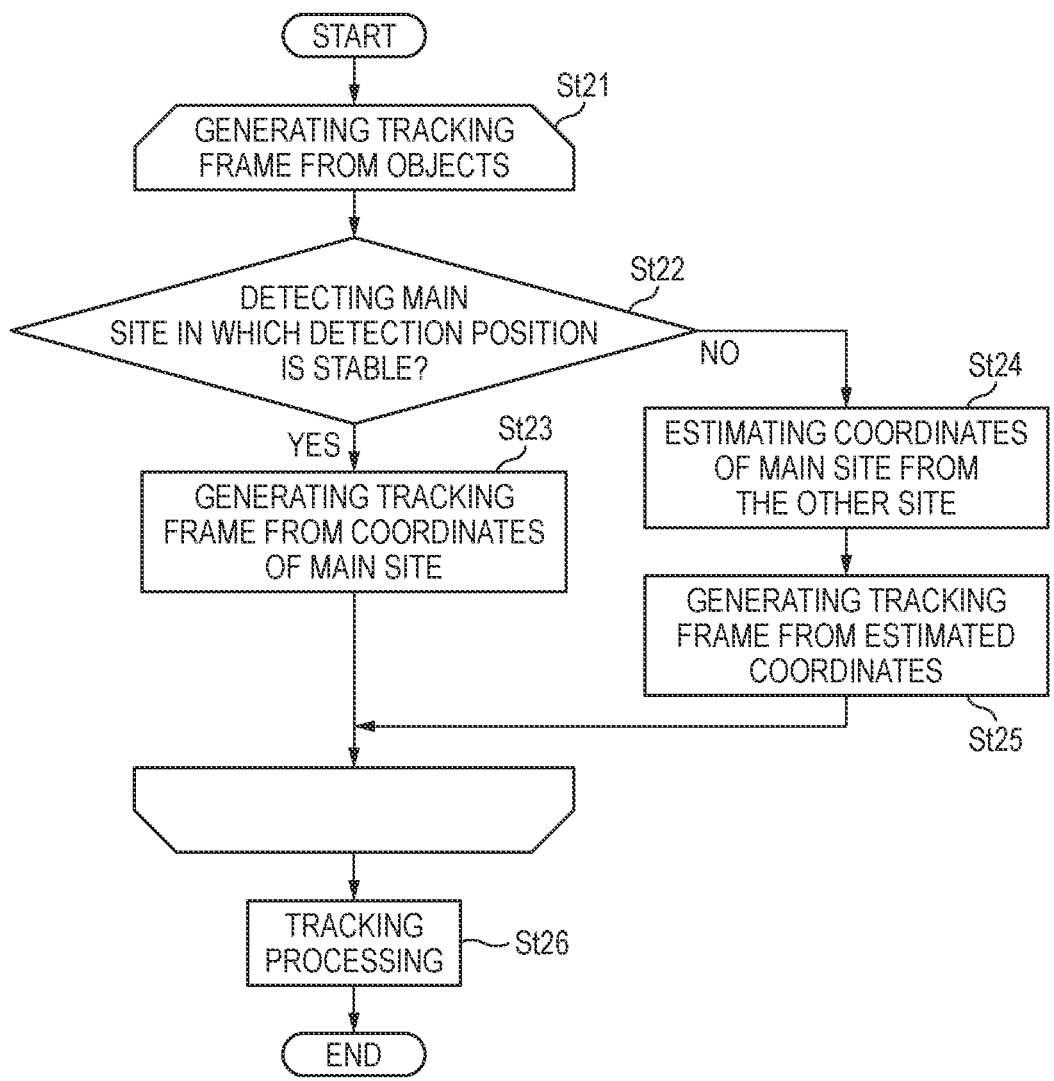
FIG. 8 is a flowchart illustrating a detailed operation procedure example of step St11 in FIG. 6.

Next, an operation procedure example of the tracking processing for tracking the row (so-called moving line) of the object by the monitoring camera 10 will be described with reference to FIGS. 7 and 8. FIG. 7 is an explanatory diagram of a generation example of the tracking frame. FIG. 8 is a flowchart illustrating a detailed operation procedure example of step St11 in FIG. 6. The operation procedure illustrated in FIG. 8 is executed each time the data of the captured image is input from the imaging unit 11 to the processor 13 mainly by the tracking unit 1312 of the AI processing unit 131 of the processor 13 of the monitoring camera 10 after the operation procedure illustrated in FIG. 4. Therefore, before the operation procedure of FIG. 8 is started, the association processing result relating to the object described with reference to FIG. 4 is obtained.

In FIG. 8, the AI processing unit 131 generates tracking frames C1 to C4 (refer to FIG. 7) for tracking processing for each object using the detection result by the site detection association unit 1311 and the association processing result (St21 to St25).

Here, an example of a method of generating a tracking frame by the tracking unit 1312 will be described with reference to FIG. 7. The method of generating a tracking frame is different in four ways: (1) a case where a scapula upper portion of an object (for example, a person) is detected, (2) a case where only a face of an object (for example, a person) is detected, (3) a case where only a whole body of an object (for example, a person) is detected, and (4) a case where only a whole body and a face of an object (for example, a person) are detected. In the description of FIG. 7, the main site of the object (for example, a person) is the scapula upper portion as in the description of FIG. 4.

(Method 1) in a Case where a Scapula Upper Portion of an Object (for Example, a Person) is Detected In a case where the scapula upper frame B1 indicating the scapula upper portion is detected by the site detection association unit 1311, for example, the tracking unit 1312 employs the same region as that of the scapula upper frame B1 as the tracking frame C1 to generate data of the tracking frame C1 (an example of the tracking frame information). The data of the tracking frame C1 is used for the tracking processing of step St26, which will be described later.

(Method 2) in a Case Only the Face of the Object (for Example, a Person) is Detected In a case where only the face frame B2 indicating the face is detected by the site detection association unit 1311, for example, the tracking unit 1312 employs a region obtained by enlarging the face frame B2 by two times as the tracking frame C2 to generate data of the tracking frame C2 (an example of tracking frame information). The data of the tracking frame C2 is used for the tracking processing of step St26, which will be described later.

(Method 3) in a Case where Only the Whole Body of the Object (for Example, a Person) is Detected In a case where only the whole body frame B3 indicating the whole body is detected by the site detection association unit 1311, for example, the tracking unit 1312 employs a region obtained by reducing the width of the whole body frame B3 to 0.6 times with respect to the width, increasing the width of the whole body frame B3 by 1.07 times with respect to the height, matching the center position of the X direction (see FIG. 7) indicating the horizontal direction with the coordinates in the X direction of the whole body frame B3, and matching the center position of the Y direction (see FIG. 7) indicating the vertical direction with the coordinates moved in the Y direction by 0.2 times the height (Y direction) of the whole body frame B3 from the position of the upper end of the whole body frame B3 as the tracking frame C3, and generates data of the tracking frame C3 (an example of the tracking frame information). The data of the tracking frame C3 is used for the tracking processing of step St26, which will be described later.

(Method 4) in a Case where Only the Whole Body and the Face of the Object (for Example, a Person) is Detected In a case where only the whole body frame B3 and the face frame B2 are detected by the site detection association unit 1311, the tracking unit 1312 employs a region obtained by averaging the region of the tracking frame C2 based on the detection of only the face and the region of the tracking frame C3 based on the detection of only the whole body as the tracking frame C4, and generates the data of the tracking frame C4 (an example of the tracking frame information). The data of the tracking frame C4 is used for the tracking processing of step St26, which will be described later.

The AI processing unit 131 determines whether or not a main site (for example, a scapula upper portion when the object is a person) that is relatively stable and easily detected in the object is detected based on the result of the association processing relating to the object described with reference to FIG. 4 (St22). When it is determined that the main site of the object has been detected (St22, YES), the AI processing unit 131 generates a tracking frame (for example, the tracking frame C1) from the coordinates (in other words, the position) of the main site in the data of the captured image input from the imaging unit 11 with reference to (Method 1) described above (St23).

On the other hand, when it is determined that the main site of the object has not been detected (St22, NO), the AI processing unit 131 estimates the position (coordinates) of the main site (for example, the scapula upper portion) from the other site (for example, the whole body or the face) other than the main site of the object with reference to one of the above-described (Method 2) to (Method 4) (St24). Further, the AI processing unit 131 generates a tracking frame from the position (coordinates) of the main site estimated in step St24 with reference to one of (Method 2) to (Method 4) described above (St25).

The AI processing unit 131 uses the tracking frames generated in steps St22 to St25 to execute tracking processing (tracking) for tracking the row (so-called moving line) of the object reflected in the data of the captured image in the tracking unit 1312 (St26). That is, since the tracking frame is generated in order to stably detect the row (so-called moving line) of the object to be tracked in the tracking processing, the tracking unit 1312 of the AI processing unit 131 can stably perform the tracking processing of the object by capturing the change in the position of the tracking frame for each object reflected in the data of the captured image by image analysis.

As described above, the monitoring camera 10 according to Embodiment 1 includes the imaging unit 11 that images at least one object (for example, a person) in the angle of view, and the processor 13 that is equipped with the artificial intelligence (AI) and that detects a plurality of characteristic parts (for example, the whole body, the scapula upper portion, and the face) of the object reflected in the data of the captured image input from the imaging unit 11 based on the artificial intelligence. The processor 13 associates information for specifying each of the plurality of detected parts (for example, coordinates indicating the position in the captured image of the part, or a cut-out image of the part) using the same object ID corresponding to the plurality of parts.

Accordingly, the monitoring camera 10 can accurately associate a plurality of characteristic parts related to the object reflected in the data (video data) of the captured image within the angle of view set in the monitoring area, and thus it is possible to support improvement of the search accuracy of one or more objects reflected in the video data within the angle of view.

In addition, the processor 13 executes the tracking processing of the object corresponding to the object ID by using the association processing result (for example, information for specifying the positions of the whole body frame portion, the scapula upper frame portion, the face frame portion, and the like) of each of the plurality of parts associated with the same object ID. Accordingly, the monitoring camera 10 can accurately capture the row (so-called moving line) of the object reflected in the data of the captured image input from the imaging unit 11 one after another.

In addition, the processor 13 determines whether or not the part to which the object ID is assigned is the best shot suitable for the identification processing of the attribute information of the object. When it is determined that the part to which the object ID is attached is the best shot, the processor 13 cuts out the part determined as the best shot from the data of the captured image based on the object ID used for the association, and executes the identification processing of the attribute information on the cut-out part. Accordingly, the monitoring camera 10 can obtain the cut-out image data obtained by cutting out the part of the best shot with high quality suitable for the identification processing from the data of the imaged image, and can accurately extract the contents of the large number of attribute information from the same object by the identification processing of each cut-out image data.

In addition, the monitoring camera 10 further includes a transmission unit 15 that transmits the identification result (identification processing result) of the attribute information of each characteristic part of the object and the information related to the best shot (best shot information) to a server (for example, the client server 20) communicably connected to the monitoring camera 10. Accordingly, the client server 20 can store the identification result of the attribute information for each object (for example, a person) obtained by the monitoring camera 10 and the information on the best shot used for the identification processing in association with each other, and thus it is possible to improve the accuracy of the search processing related to the object.

In addition, the object is at least one person. The plurality of parts include a scapula upper portion of a person and a whole body of a person or a face of a person. Accordingly, the monitoring camera 10 can comprehensively extract, for one or more persons appearing in the monitoring area, various attribute information which is characteristic information of a person from images of characteristic parts of each person.

In addition, the processor 13 identifies at least one of gender, age, hairstyle, hair color, beard, presence/absence of mask, and presence/absence of glasses of a person based on the cut-out image of the scapula upper frame indicating the scapula upper portion. The processor 13 identifies at least one of the clothing type, clothing color, bag, and muffler of the person based on the cut-out image of the whole body frame indicating the whole body. Accordingly, the monitoring camera 10 can extract at least one of the gender, age, hairstyle, hair color, beard, presence/absence of mask, and presence/absence of glasses with high accuracy based on the cut-out image of the scapula upper frame indicating the scapula upper portion of the person. In addition, the monitoring camera 10 can extract at least one of the clothing type, clothing color, bag, and muffler of the person with high accuracy based on the cut-out image of the whole body frame indicating the whole body of the person.

In addition, the object is a plurality of persons and vehicles. The plurality of parts include the whole body of the person and the entire vehicle. Accordingly, the monitoring camera 10 can associate a pair of a plurality of objects having different types (for example, a person and a bicycle) reflected in the data of the captured image with the same object ID.

In addition, the monitoring camera 10 according to Embodiment 1 includes the imaging unit 11 that captures an image of at least one object (for example, a person) within the angle of view, and the processor 13 that is equipped with the artificial intelligence (AI) and that detects the characteristic parts (for example, a whole body, a scapula upper portion, and a face) of the object reflected in the data of the captured image input from the imaging unit 11 based on the artificial intelligence. The processor 13 determines whether or not a detection part (for example, the whole body, the scapula upper shoulder, or a face), which is a part detected based on the artificial intelligence, is a priority part (for example, a scapula upper portion) suitable for the tracking processing of the object. When it is determined that the detection part is the priority part (see (Method 1) described above), the processor 13 uses the priority part as the tracking frame to perform the tracking processing of the object.

Accordingly, the monitoring camera 10 can use, as a tracking frame, a priority part (for example, a scapula upper portion) suitable for tracking an object (for example, a person) reflected in the data (video data) of the captured image within the angle of view set in the monitoring area, and thus it is possible to support improvement of the tracking accuracy of the object reflected in the video data within the angle of view. Therefore, for example, in a case where a person is viewed from the monitoring camera 10, even in a case where a part or the whole of a shield (for example, a desk, a multifunction machine, or a wall) in front of the person shields the person, by using the priority part (for example, a scapula upper portion) as a tracking frame, the client server 20 can perform efficient search processing.

In addition, when it is determined that the detection part is not a priority part (see (Method 2) to (Method 4) described above), the processor 13 generates a tracking frame based on the detection part and executes tracking processing of the object. Accordingly, even in a situation in which it is difficult to detect the priority part depending on the movement or the posture of the object, the monitoring camera 10 can generate the tracking frame by estimating the position of the priority part (for example, the scapula upper portion) from the information (for example, the coordinates indicating the position in the captured image of the detection part) for specifying the detection part (for example, the whole body or the face) which is not the priority part, and thus the monitoring camera 10 can execute the tracking processing of the object generally and accurately.

In addition, the object is at least one person. The priority part is the scapula upper portion of the person. Accordingly, the monitoring camera 10 can perform tracking processing with high accuracy using information (for example, coordinates indicating the position in the captured image of the scapula upper portion) for specifying the scapula upper frame portion indicating the scapula upper portion of each person for one or more persons appearing in the monitoring area.

In addition, when it is determined that the detection part is only the face of the person, the processor 13 generates the tracking frame based on the face frame information of the person (that is, information such as coordinates in the captured image that specifies the face frame portion). Accordingly, even when only the face can be detected based on the AI based on the movement or posture of the person, the monitoring camera 10 can estimate the position of the priority part (for example, the scapula upper portion) with high accuracy by using the face frame information (see above), and thus it is possible to suppress the accuracy deterioration of the tracking processing for the person.

In addition, when it is determined that the detection part is only the whole body of the person, the processor 13 generates the tracking frame based on the whole body frame information of the person (that is, information such as coordinates in the captured image that specifies the whole body frame portion). Accordingly, even when only the whole body can be detected based on the AI based on the movement or posture of the person, the monitoring camera 10 can estimate the position of the priority part (for example, the scapula upper portion) with high accuracy by using the data of the whole body frame information (see above), and thus it is possible to suppress the accuracy deterioration of the tracking processing for the person.

In addition, when it is determined that the detection part is only the face and the whole body of the person, the processor 13 generates a tracking frame based on the face frame information of the person (see above) and the whole body frame information (see above). Accordingly, even when only the whole body and the face can be detected based on the AI based on the movement or posture of the person, the monitoring camera 10 can estimate the position of the priority part (for example, the scapula upper portion) with high accuracy by using each data of the whole body frame information (see above) and the face frame information (see above), and thus it is possible to suppress the accuracy deterioration of the tracking processing for the person.

Although various embodiments have been described with reference to the accompanying drawings, the present disclosure is not limited to examples in the embodiments. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present invention. Components in various embodiments described above may be combined freely within a range without deviating from the spirit of the invention.

The present disclosure is useful as a monitoring camera, a part association method, and a program for supporting improvement of search accuracy of one or more objects reflected in video data within an angle of view.

What is claimed is:

1. A monitoring camera, comprising:
a camera that is configured to capture an image of at least one object in an angle of view, and
a processor that is equipped with artificial intelligence and that is configured to generate a tracking frame within a captured image input from the camera and to detect a plurality of characteristic parts of the object reflected in the tracking frame based on the artificial intelligence,
wherein the processor
associates, for each of the at least one object, information for specifying each of a plurality of detected characteristic parts, from among the plurality of characteristic parts, with a same object ID,
when the processor detects a predetermined part of the plurality of characteristic parts as one of the plurality of detected characteristic parts, the processor performs tracking processing of the object based on the tracking frame, and
when the plurality of detected characteristic parts does not include the predetermined part, the processor enlarges the tracking frame, estimates coordinates of the predetermined part in the enlarged tracking frame, and performs the tracking processing of the object based on the enlarged tracking frame which includes the estimated coordinates of the predetermined part.

2. The monitoring camera according to claim 1,
wherein the processor
when the plurality of detected characteristic parts does not include the predetermined part, performs the tracking processing of the object based on an association processing result of each of the plurality of detected characteristic parts associated with the same object ID.

3. The monitoring camera according to claim 1,
wherein the processor
determines whether or not a part to which an object ID is assigned is a best shot suitable for identification processing of attribute information of an object corresponding to the object ID, and
in a case where the part to which the object ID is assigned is determined to be the best shot, cuts out the part determined to be the best shot from the captured image based on the object ID, and performs the identification processing of the attribute information on the cut-out part.

4. The monitoring camera according to claim 3,
wherein the processor is configured to transmit an identification result of the attribute information for each of the plurality of characteristic parts and information related to the best shot to a server communicably connected to the monitoring camera.

5. The monitoring camera according to claim 3, wherein
the at least one object comprises at least one person, and
the plurality of characteristic parts includes a scapula upper portion of the person, the scapula upper portion containing a scapula and a portion above the scapula, and a whole body of the person or a face of the person.

6. The monitoring camera according to claim 5,
wherein the processor
identifies at least one of a gender, an age, a hairstyle, a hair color, a presence or an absence of a beard, a presence or an absence of a mask, and a presence or an absence of glasses of the person based on a scapula upper frame image indicating the scapula upper portion of the person, and identifies at least one of a clothing type, a clothing color, a bag, and a muffler of the person based on a whole body frame image indicating the whole body of the person.

7. The monitoring camera according to claim 1, wherein the at least one object comprises a plurality of persons and a vehicle, and
the plurality of characteristic parts includes a whole body of each of the plurality of persons and an entire portion of the vehicle.

8. A part association method performed by a monitoring camera equipped with artificial intelligence,
the part association method comprising:
capturing an image of at least one object in an angle of view;
generating a tracking frame within the image;
detecting a plurality of characteristic parts of the object reflected in the tracking frame based on the artificial intelligence, and
associating, for each of the at least one object, information for specifying each of a plurality of detected characteristic parts, from among the plurality of characteristic parts, with a same object ID,
wherein, when a predetermined part of the plurality of characteristic parts is detected as one of the plurality of detected characteristic parts, the part association method performs tracking processing of the object based on the tracking frame, and
when the plurality of detected characteristic parts does not include the predetermined part, the part association method enlarges the tracking frame, estimates coordinates of the predetermined part in the enlarged tracking frame, and performs the tracking processing of the object based on the enlarged tracking frame which includes the estimated coordinates of the predetermined part.

9. A monitoring camera, comprising:
a camera that is configured to capture an image of at least one object in an angle of view, and
a processor that is equipped with artificial intelligence and that is configured to generate a tracking frame within a captured image input from the camera and to detect a characteristic part of the object reflected in the tracking frame based on the artificial intelligence,
wherein the processor
determines whether or not the characteristic part detected based on the artificial intelligence is a priority part suitable for tracking processing of the object,
uses the priority part in the tracking frame to perform the tracking processing of the object in a case where the detected characteristic part is the priority part, and
enlarges the tracking frame, estimates the priority part in the enlarged tracking frame based on the detected characteristic part, and uses the enlarged tracking frame, including the estimated priority part, to perform the tracking processing of the object in a case where the detected characteristic part is not the priority part.

10. The monitoring camera according to claim 9, wherein the processor
generates the tracking frame based on the detected characteristic part in the case where the detected characteristic part is not the priority part, and performs the tracking processing of the object.

11. The monitoring camera according to claim 9, wherein the at lease one object comprises at least one person, and the priority part is a scapula upper portion of the person containing a scapula and a portion above the scapula.

12. The monitoring camera according to claim 11, wherein the processor
generates the tracking frame based on face frame information of the person in a case where the detected characteristic part is only a face of the person.

13. The monitoring camera according to claim 11, wherein the processor
generates the tracking frame based on whole body frame information of the person in a case where the detected characteristic part is only a whole body of the person.

14. The monitoring camera according to claim 11, wherein the processor
generates the tracking frame based on face frame information and whole body frame information of the person in a case where the detected characteristic part is only a face and a whole body of the person.

15. A tracking frame generation method performed by a monitoring camera equipped with artificial intelligence,
the tracking frame generation method comprising:
capturing an image of at least one object in an angle of view;
generating a tracking frame within the image;
detecting a characteristic part of the object reflected in the tracking frame based on the artificial intelligence;
determining whether or not a detection part detected based on the artificial intelligence is a priority part suitable for tracking processing of the object;
using the priority part in the tracking frame to perform the tracking processing of the object in a case where the detection part is the priority part; and
enlarging the tracking frame and estimating the priority part in the enlarged tracking frame based on the detection part and using the enlarged tracking frame, including the estimated priority part, to perform the tracking processing of the object in a case where the detection part is not the priority part.

16. The monitoring camera according to claim 1, wherein the processor estimates the coordinates of the predetermined part by enlarging the tracking frame by a predetermined multiple, in order to generate data of the enlarged tracking frame.

17. The monitoring camera according to claim 1, wherein the processor estimates the coordinates of the predetermined part by reducing a width of the tracking frame, increasing a height of the tracking frame, matching a center position of an X direction indicating a horizontal direction with coordinates in the X direction of the tracking frame, and matching a center position of a Y direction indicating a vertical direction with coordinates moved in the Y direction of the tracking frame, in order to generate data of the enlarged tracking frame.

18. The monitoring camera according to claim 1, wherein the processor estimates the coordinates of the predetermined part by averaging regions of the captured image based on the plurality of detected characteristic parts, in order to generate data of the enlarged tracking frame.

* * * * *